(12) United States Patent
Huang et al.

(10) Patent No.: US 9,590,806 B2
(45) Date of Patent: Mar. 7, 2017

(54) SECURE PROVISIONING OF SEMICONDUCTOR CHIPS IN UNTRUSTED MANUFACTURING FACTORIES

(71) Applicant: NVIDIA CORPORATION, Santa Clara, CA (US)

(72) Inventors: Jay Huang, Sunnyvale, CA (US); Paul Chou, Santa Clara, CA (US); Anthony Woo, Millbrae, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 14/723,411

(22) Filed: May 27, 2015

(65) Prior Publication Data

US 2016/0352514 A1 Dec. 1, 2016

(51) Int. Cl.
*H04L 9/00* (2006.01)
*H04L 9/08* (2006.01)

(52) U.S. Cl.
CPC ........ *H04L 9/0822* (2013.01); *H04L 2209/12* (2013.01); *H04L 2209/24* (2013.01)

(58) Field of Classification Search
CPC ..................................................... H04L 9/0822
USPC ........................................................... 726/27
See application file for complete search history.

(56) References Cited

U.S. PATENT DOCUMENTS

| | | | | |
|---|---|---|---|---|
| 7,778,249 B2 * | 8/2010 | Dougall | ................ | H04L 1/1851 370/392 |
| 8,214,630 B2 * | 7/2012 | Peterka | ............ | G01R 31/31719 713/1 |
| 9,100,174 B2 * | 8/2015 | Hartley | ................. | H04L 9/0866 |
| 2014/0359755 A1 * | 12/2014 | Beitel | ..................... | G06F 21/76 726/18 |

\* cited by examiner

*Primary Examiner* — Longbit Chai
(74) *Attorney, Agent, or Firm* — Artegis Law Group, LLP

(57) ABSTRACT

One embodiment of the present invention includes a boot read only memory (ROM) with an embedded, private key provision key (KPK) set that enables secure provisioning of chips. As part of taping-out a chip, the chip provider establishes the KPK set and provides the boot ROM exclusive access to the KPK. For each Original Equipment Manufacturer (OEM), the chip provider assigns and discloses an OEM-specific KPK that is included in the KPK set at a particular KPK index. Upon receiving a secured provisioning image and the associated KPK index, the boot ROM accesses the KPK set to reconstruct the KPK and then decrypts and executes the secured provisioning image. Advantageously, this enables the manufacturing factory to provision the chip without the security risks attributable to conventional provisioning approaches that require disclosing security keys to the manufacturing factory.

20 Claims, 6 Drawing Sheets

SECURE PROVISIONING OF SEMICONDUCTOR CHIPS IN UNTRUSTED MANUFACTURING FACTORIES

BACKGROUND OF THE INVENTION

Field of the Invention

The present invention generally relates to semiconductors and, more specifically, to secure provisioning of semiconductor chips in untrusted manufacturing factories.

Description of the Related Art

A typical computer system includes a central processing unit (CPU) and one or more parallel processing units (GPUs). The CPU usually executes the overall structure of a software application and then configures the PPUs to implement tasks that are amenable to parallel processing. As part of executing the software application, the CPU and the GPU access memory units included in the computer system. Often, one or more of the processing units, memory units, and connection circuitry are integrated to form single subsystem and then implemented in a semiconductor chip as a system on chip (SoC).

Increasingly, SoCs are configured to implement security measures intended to enable consumers to execute original equipment manufacturer (OEM) software applications on the processing unit in the SoC without jeopardizing either the consumer or the OEM. In particular, such "secure provisioning" is designed to both thwart unauthorized execution of the software application and protect the assets of the OEM. For example, successful secure provisioning protects the consumer against fraudulent software applications that implement malicious algorithms. In addition, secure provisioning usually protects the OEM assets from attempts at reverse engineering the software application.

In one approach to secure provisioning, a chip provider provides the OEM with production chips, and the OEM generates one or more security keys (also known as authentication keys). These security keys are intended to enable storage and retrieval of encrypted data on non-volatile memory included in the production chip. Notably, this non-volatile memory is not directly accessible by the consumer. The OEM then encrypts an OEM-developed software application (e.g., an operating system) and any additional OEM-specific chip configuration data via the security keys, generating a provisioning image. Subsequently, the OEM transfers the production chips, the security keys, and the provisioning image to a manufacturing factory. The manufacturing factory applies the provisioning image to the production chips. Among other things, the provisioning image configures the non-volatile memory in each production chip to gate execution of the software application based on authentication of the security keys. Finally, the manufacturing factory delivers the configured production chips to the consumer as secure consumer chips.

While such a security approach facilitates the protection of the software application at some stages in the secure provisioning process, the security of the provisioning image may be breached at the manufacturing factory. For example, a malicious employee at the manufactory factory may acquire the security keys, thereby rendering the security efforts ineffective and jeopardizing both the consumer and OEM. This gap in the security flow may be reduced by vetting the manufacturing factory and then limiting the number of manufacturing factories permitted to generate consumer chips to selected "trusted" manufacturing factories. However, such an approach only reduces the security risk and does not eliminate the exposure at the manufacturing factory. Further, restricting the number of manufacturing factories to trusted manufacturing factories may unacceptably constrain the generation of secure consumer chips. For example, the set of trusted manufacturing factories may not include enough cost-effective manufacturing factories to enable high volume production of competitively-priced secure consumer chips.

As the foregoing illustrates, what is needed in the art is a more effective approach to secure provisioning of semiconductor chips.

SUMMARY OF THE INVENTION

One embodiment of the present invention sets forth a computer-implemented method for enabling secure execution of provisioning images within semiconductor chips. The method includes generating a first semiconductor chip that includes a key provision key (KPK) set, where the KPK set includes a first KPK located at a first KPK index and a second KPK located at a second KPK index; configuring the semiconductor chip to, upon receiving the first KPK index in a secure provisioning mode, securely decrypt and execute a first encrypted provisioning image based on the first KPK index without disclosing the first KPK or the second KPK; and sending the first semiconductor chip, the first KPK, and the first KPK index to a first entity, but keeping the second KPK secret from the first entity.

One advantage of the disclosed approach is that the integrity of the provisioning process at the original equipment manufacturer (OEM) is maintained irrespective of the integrity of the manufacturing process at the manufacturing factory. Notably, each OEM only receives the value of a single KPK—the one assigned to the particular OEM—and the manufacturing factory receives the value of none of the KPKs. By contrast, in conventional secure provisioning techniques, the manufacturing factory receives the security key(s) used to encrypt the provisioning image, thereby linking the effectiveness of the secure provisioning with the integrity of the manufacturing factory.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
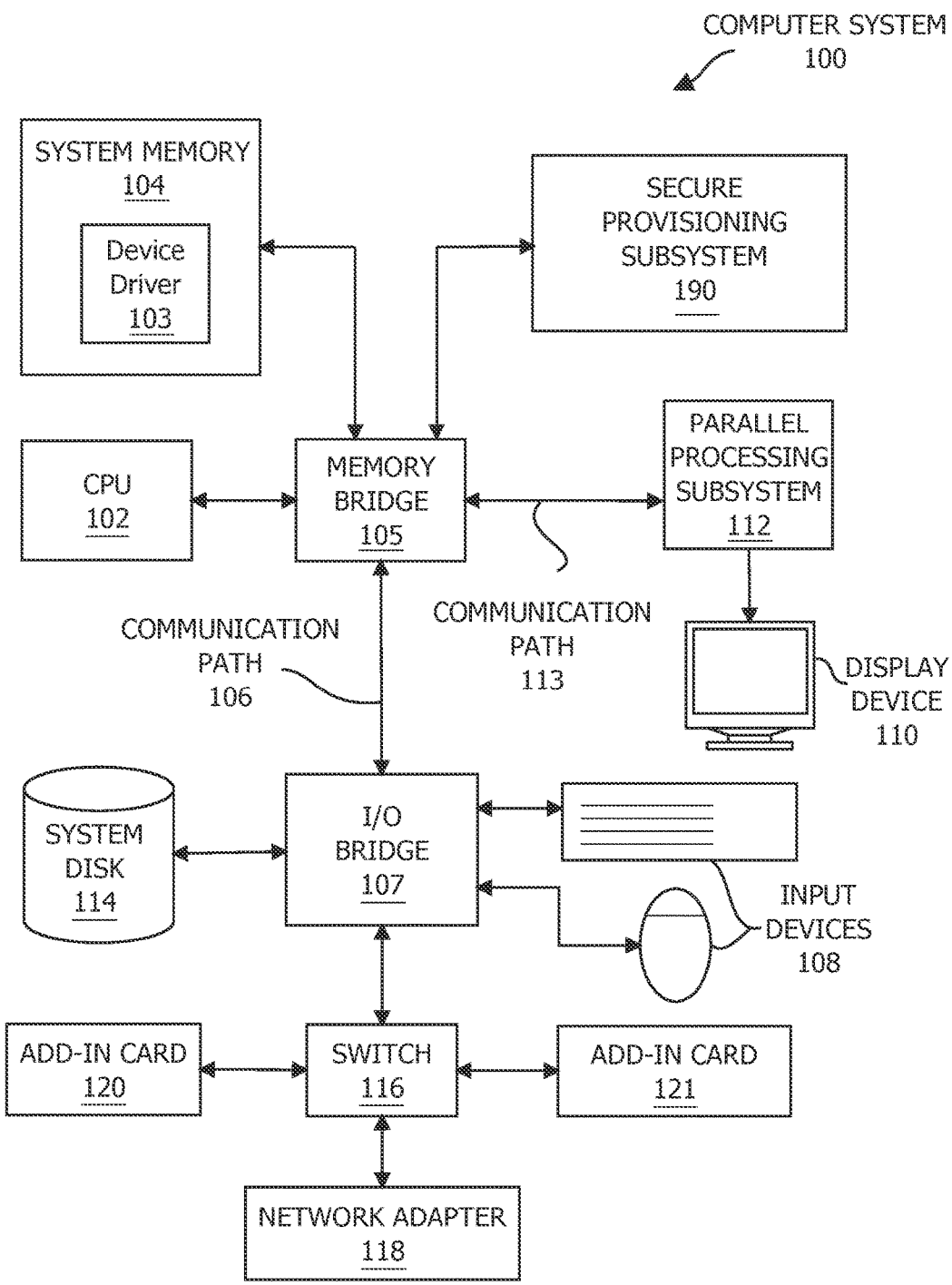
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. Such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Secure Provisioning Subsystem

In various embodiments, a chip provider implements a secure provisioning subsystem 190 and one or more other of the elements of FIG. 1 as a "system on chip" (SoC). For example, the chip provider may integrate the secure provisioning subsystem 190, the parallel processing subsystem 112, the CPU 102, and other connection circuitry into the SoC. Often, after manufacturing the SoC as a production chip, the chip provider delivers the production chip to an original equipment manufacturer (OEM) for OEM-specific customization.

At the intermediate stage in the customized manufacturing flow, the OEM creates a provisioning image (not shown in FIG. 1) that, when executed within the production chip, configures the production chip as a secure consumer chip. For instance, the provisioning image may customize the production chip to optimally and securely execute an encrypted production image, such as a confidential OEM-developed software application. At the final stage in the customized manufacturing flow, the OEM delivers the production chip and the provisioning image to a manufacturing factory. The manufacturing factory then causes the production chip to execute the provisioning image and delivers the resulting consumer chip to the end user (i.e., the consumer).

Again, the provisioning image typically includes valuable assets (e.g., a leading-edge software application, security keys, etc.) for which the OEM requires confidentiality. Advantageously, functionality included in the secure provisioning subsystem 190 enables the OEM to keep such assets secret from both the manufacturing factory and the consumer. More specifically, the secure provisioning subsystem 190 allows the production chip to authenticate, decrypt and execute a secured provisioning image without revealing the associated security key or the contents of the decrypted provisioning image to the manufacturing factory. Subsequently, the secure provisioning subsystem 190 enables the consumer chip to execute a secured production image—installed by the provisioning image—while keeping the decrypted production image secret from the chip provider, the manufacturing factory, and the consumer.

Figure 2:
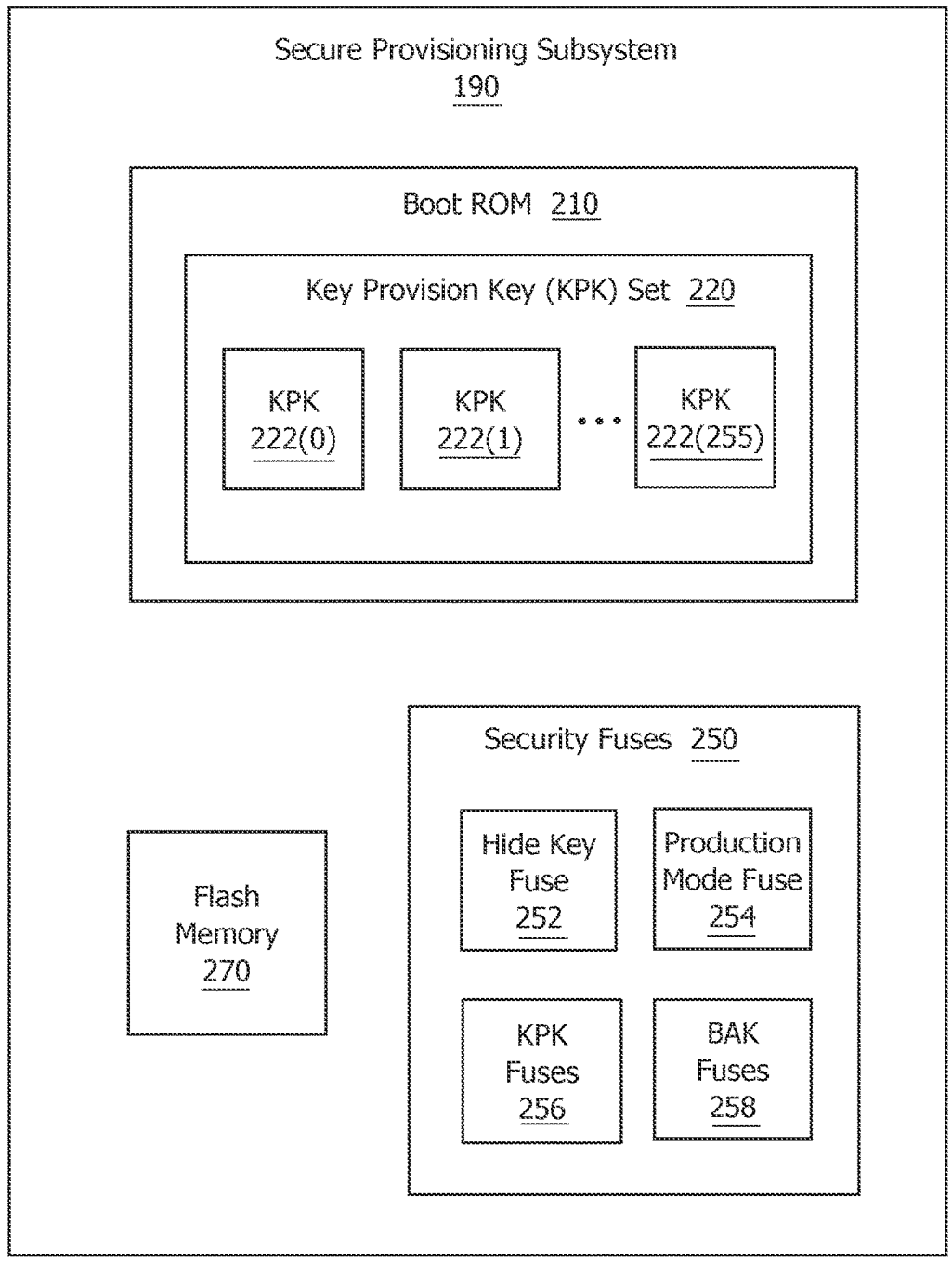
FIG. 2 is a block diagram illustrating the secure provisioning subsystem of FIG. 1, according to one embodiment of the present invention.

FIG. 2 is a block diagram illustrating the secure provisioning subsystem 190 of FIG. 1, according to one embodiment of the present invention. As shown, the secure provisioning subsystem 190 includes, without limitation, a boot ROM 210, security fuses 250, and a flash memory 270. Together, the boot ROM 210, the security fuses 250, and the flash memory 270 mitigate security risks associated with executing the provisioning image at potentially insecure manufacturing factories.

When the production chip is activated in a provisioning mode, the boot ROM 210 implements a sequence of one or more instructions that securely execute the secured provisioning image. Notably, the boot ROM 210 authenticates, decrypts, and executes the secured provisioning image without disclosing the unencrypted contents to the manufacturing factory. In conventional approaches to secure provisioning, the manufacturing factory requires direct access to the security key associated with encrypting and decrypting the secured provisioning image. As persons skilled in the art will recognize, disclosing the security key to the manufacturing factory exposes the security key and therefore jeopardizes the integrity of the encryption process. By contrast, the boot ROM 210 internally derives the security key from a security key index. Consequently, the manufacturing factory does not require the security key—only the security key index. Advantageously, introducing this level of indirection ensures the integrity of the security measures irrespective of the trustworthiness of the manufacturing factory.

To enable such security key indirection, the boot ROM 210 includes a key provision key (KPK) set 220 and, in turn, the KPK set 220 includes KPKs 222(0) through 222(255). In alternate embodiments, the KPK set 220 may include any number of KPKs 222. Each KPK 222 is a security key, such as a 256-bit advanced encryption standard (AES) key, that is accessible only to the boot ROM 210. Further, each KPK 222 is associated with a KPK index (not shown in FIG. 2) that identifies the particular KPK 222 based on the KPK set 220. For instance, in some embodiments, the KPK set 220 is implemented in an internal ROM (iROM) as an array of KPKs 222. In such embodiments, the KPK index is an offset from the physical memory address of the KPK set 220. In alternate embodiments, each KPK 222 may be associated with a corresponding KPK index in any technically feasible fashion.

Advantageously, since the KPK set 220 is accessible only to the boot ROM 210 and the values of each of the KPKs 222 are determined at tape-out, the chip provider controls the confidentiality of each of the KPKs 222. For instance, the chip provider may elect to keep the value of the KPK 222(0) secret, disclose the value of the KPK 222(1) to one OEM, and disclose the value of the KPK 222(2) to a different OEM. In alternate embodiments the boot ROM 210 may not include the KPK set 220. In such embodiments, the KPK set 220 may be included in any location included in the secure provisioning subsystem 190 that may be accessed during boot, but may subsequently be configured to be inaccessible to protect the confidentiality of KPKs 222. The accessibility of the KPKs 220 may be manipulated in any technically feasible fashion that is consistent with the location of the KPK set 220.

In operation, the OEM signs and encrypts a production image based on both the assigned KPK 222 and an OEM-private boot authentication key (BAK). In some embodiments, the OEM may apply additional security keys. Subsequently, the OEM creates a provisioning image that includes the encrypted production image along with the BAK. The OEM then signs and encrypts the provisioning image based on the KPK 222. By following this two level encryption scheme, the OEM secures the OEM assets from illicit access. To enable the secure provisioning subsystem 190 to distinguish illicit accesses from legitimate execution of the provisioned assets, the provisioning image performs read and write operations on the security fuses 250.

As shown, the security fuses 250 include, without limitation, a hide key fuse 252, a production mode fuse 254, KPK fuses 256, and BAK fuses 258. In alternate embodiments, the security fuses 250 may include any number of different fuses in any combination. For example, the security fuses 250 may include a variety of different fuses that the provisioning image configures based on additional OEM-owned keys. As part of the provisioning process, the provisioning image performs write operations that burn the KPK fuses 256 and the BAK fuses 258 to reflect the KPK 222 and the BAK respectively. After the provisioning image successfully configures the KPK fuses 256 and the BAK fuses 258, the provisioning image burns the production mode fuse 254, enabling the security associated with the provisioned, consumer chip. Notably, as part of initializing the secured consumer chip, the execution of the production image is gated based on the successful internal verification of the KPK fuses 256 and the BAK fuses 258.

As persons skilled in the art will recognize, during the provisioning process, a malicious entity at the manufacturing factory could disconnect the production chip after the provisioning image configures the KPK fuses 256 and the BAK fuses 258, but before the provisioning image burns the production mode fuse 254. To thwart such an external attempt to read the KPK fuses 256 and the BAK fuses 258, the provisioning image burns the hide key fuse 252 prior to burning the KPK fuses 256 and the BAK fuses 258. Advantageously, when the key fuse 252 is burned, read access to the KPK fuses 256 and the BAK fuses 258 is disabled and, therefore, security is preserved.

In addition to the security fuses 250, the secure provisioning subsystem 190 includes the flash memory 270. The flash memory 270 is a restricted-access, non-volatile memory included in the secure provisioning subsystem 190. During provisioning, the boot ROM 210 and the provisioning image may perform read and write operations on the flash memory 270 to facilitate both provisioning-mode operations and consumer-mode operations. For example, in some embodiments, the provisioning image performs write operations to store the encrypted production image in the flash memory 270. In alternate embodiments, the secure provisioning subsystem 190 may include various execution units, software programs, and memories that facilitate any additional security measures. Further, the secure provisioning subsystem 190 may implement any technically feasible method as known in the art to securely execute the production image.

Figure 3:
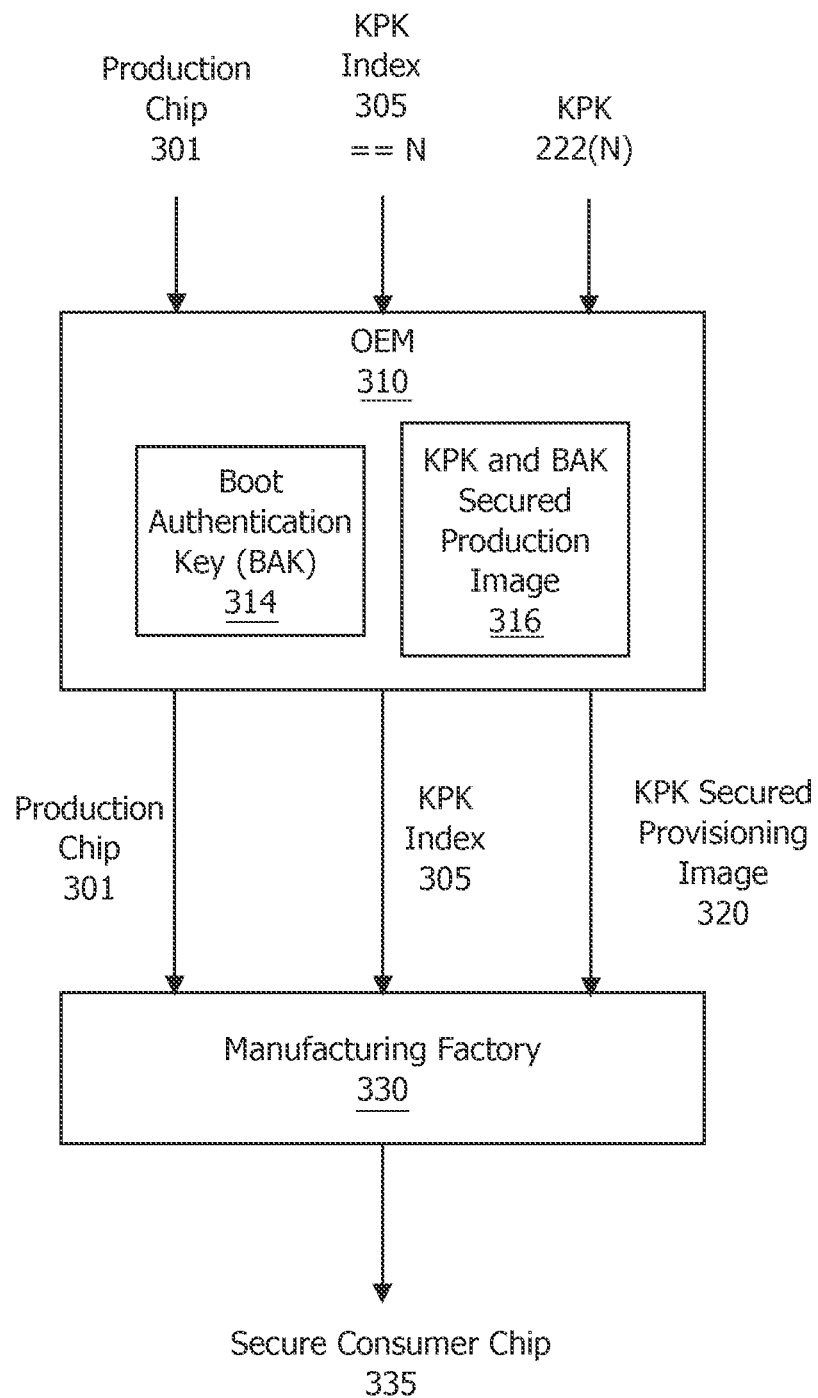
FIG. 3 is a conceptual diagram illustrating how a production chip that includes the secure provisioning subsystem of FIG. 1 is processed to produce a secure consumer chip, according to one embodiment of the present invention.

FIG. 3 is a conceptual diagram illustrating how a production chip 301 that includes the secure provisioning subsystem 190 of FIG. 1 is processed to produce a secure consumer chip 335, according to one embodiment of the present invention. As shown, an OEM 310 and a manufacturing factory 330 collaborate to transform the production chip 301 into the secure consumer chip 335.

First, the chip provider (not shown) assigns a particular KPK 222(N) to the OEM 310. As outlined in conjunction with FIG. 2, the KPK 222(N) is associated with a KPK index 305 that is set to the value N. The chip provider conveys the production chip 301 and the KPK index 305 to the OEM 310 in any technically feasible fashion. And, to maintain the confidentiality of the KPK 222(N), the chip provider securely transmits the KPK 222(N) to the OEM 310. For instance, in some embodiments, the chip provider sends an encrypted email containing the KPK 222(N) to the OEM 310. Notably, the chip provider does not share any of the other KPKs 222 with the OEM 310.

The OEM 310 establishes the OEM-owned security measures. In particular, the OEM 310 generates a boot authentication key (BAK) 314 and a production image (not shown) that includes information the OEM 310 wishes to keep secret from the chip producer, the manufacturing factory 330, and the consumer. The OEM 310 encrypts and signs the production image based on any technically feasible security methodology that is supported by the secure provisioning subsystem 190. As shown, the OEM 310 incorporates both the KPK 222(N) and the BAK 314 into this security process, generating a KPK and BAK secured production image 316. In alternate embodiments, the OEM 310 may generate any number of private keys and may apply these keys with or without the KPK 222(N) and the BAK 314 to create a secured production image.

After generating the KPK and BAK secured production image 316, the OEM 310 assembles the KPK and BAK secured production image 316, the BAK 314, provisioning instructions, and any other confidential data into a provisioning image. As outlined previously herein, upon execution within the production chip 301, the provisioning image configures the production chip 301 to reflect OEM-specific functionality. Further, the provisioning image includes functionality, such as burning the hide key fuse 252 at the appropriate time, that optimally leverages the security features of the secure provisioning subsystem 190. After creating the provisioning image, the OEM 310 signs and encrypts this provisioning image based on the KPK 222(N), generating a KPK secured provisioning image 320.

The OEM 310 then relays the KPK secured provisioning image 320, the production chip 301, and the KPK index 305 to the manufacturing factory 330. The OEM 310 may transmit data to the manufacturing factory 330 in any technically feasible fashion. For instance, in some embodiments, the OEM 310 stores the KPK secured provisioning image 320 in a secondary boot device, such as an embedded multimedia card, and then delivers this secondary boot device to the manufacturing factory 330. Further, the OEM 310 may include the KPK index 305 in a header file of ancillary provisioning data that the OEM 310 transmits to the manufacturing factory 330.

Upon receiving the production chip 301, the KPK secured provisioning image 320, and the KPK index 305, the manufacturing factory "boots" the production chip 301. The boot ROM 210 of FIG. 2 attempts to authenticate and unencrypt the KPK secured provisioning image 320 based on the KPK index 305. More specifically, the boot ROM 210 accesses the KPK set 220 and performs read operations to retrieve the specific KPK 222(N) stored at the offset specified by the KPK index 305 of N. If the boot ROM 210 successfully authenticates and decrypts the KPK secured provisioning image 320 based on the KPK 255(N), then the boot ROM 210 causes the provisioning mage to execute. If the boot ROM 210 in unable to authenticate and decrypt the KPK secured provisioning image 320, then the boot ROM 210 aborts the provisioning process—protecting the OEM 310 and consumer from attempts to hijack the customization of the production chip 301. As the provisioning image finishes executing, the provisioning image burns the production mode fuse 254, thereby signifying the successful transformation of the production chip 301 into the secure consumer chip 335.

Figure 4A:
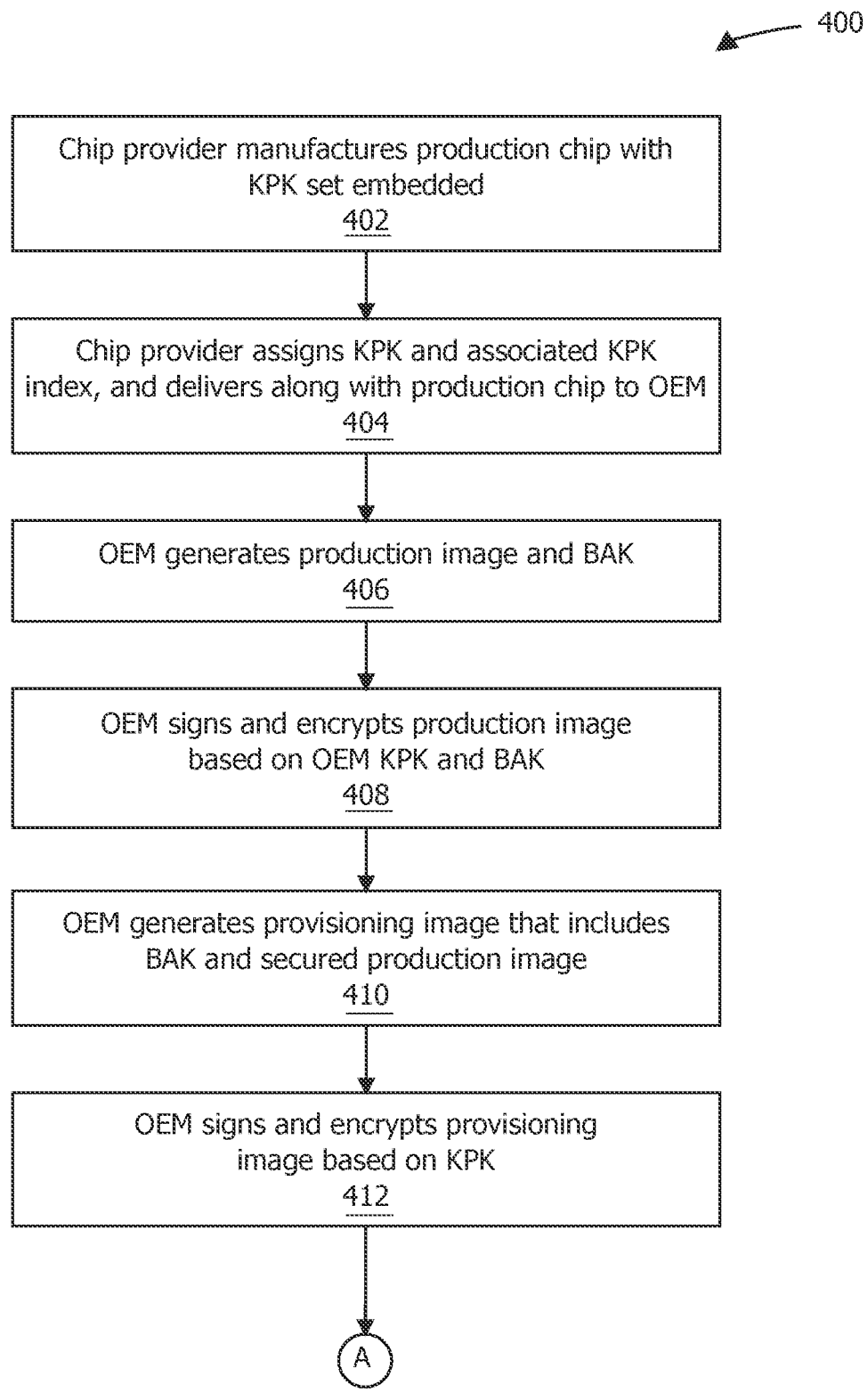
FIGS. 4A-4B set forth a flow diagram of method steps for securely provisioning production chips irrespective of the trustworthiness of the manufacturing factory, according to one embodiment of the present invention.
Figure 4B:
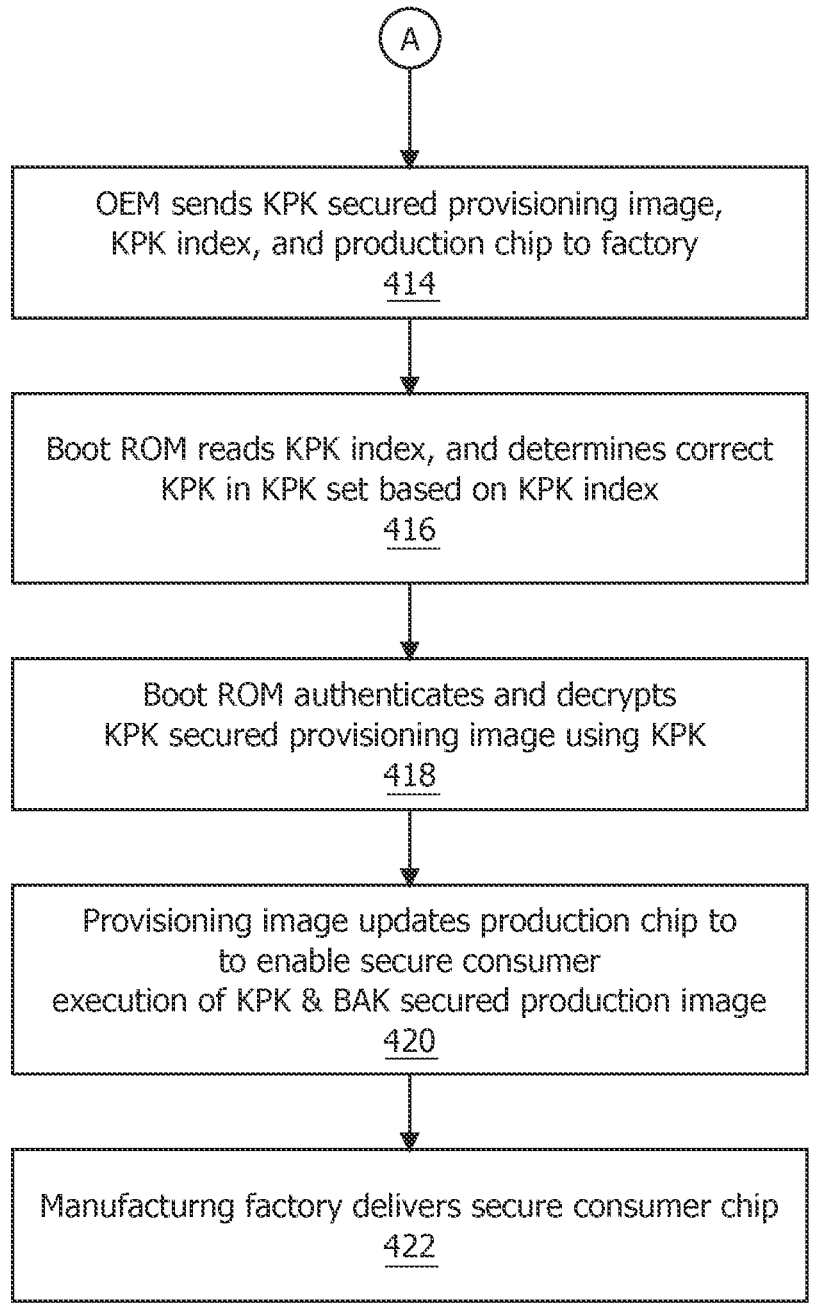

FIGS. 4A-4B set forth a flow diagram of method steps for securely provisioning production chips irrespective of the trustworthiness of the manufacturing factory, according to one embodiment of the present invention. Although the method steps are described herein in conjunction with the systems of FIGS. 1-3, persons skilled in the art will understand that any system configured to implement the method steps, in any order, falls within the scope of the present invention.

As shown, a method 400 begins at step 402, where the chip provider manufactures the production chip 301 with the KPK set 220 embedded within the boot ROM 210. At step 404, the chip provider assigns an OEM-specific KPK 222(N) included in the KPK set 220 in addition to the corresponding KPK index 305. As part of step 404, the chip provider delivers the production chip 301, the KPK index 305, and the KPK 222(N) to the OEM 310. Although the chip provider may deliver the production chip 301 and the KPK index 305 without taking any special security precautions, the chip provider delivers the KPK 222(N) in a secure manner that ensures that the KPK 222(N) is only known to the chip provider and the OEM 310.

At step 406, the OEM 310 generates the boot authentication key (BAK) 314 and a production image that includes information the OEM 310 wishes to keep secret from the chip producer, the manufacturing factory 330, and the consumer. At step 408, the OEM 310 encrypts and signs the production image based on both the KPK 222(N) and the BAK 314, thereby generating the KPK and BAK secured production image 316. At step 410, the OEM 310 generates a provisioning image that includes the secured production image 316, the BAK 314, provisioning instructions, and any additional confidential data associated with the provisioning process. At step 412, the OEM 310 encrypts and signs the provisioning image based on the KPK 222(N), generating the KPK secured provisioning image 320.

At step 414, the OEM 310 conveys the KPK secured provisioning image 320, the KPK index 305, and the production chip 301 to the manufacturing factory 330. By contrast, the OEM 310 does not share the KPK 222(N) with the manufacturing factory 330. At step 416, the manufacturing factory 330 initializes the production chip 301, causing the boot ROM 210 to execute a series of initial provisioning instructions. As part of step 416, the boot ROM 210 accesses the KPK set 220 based on the KPK index 305, performing read operations to reproduce the KPK 222(N) without disclosing the KPK 222(N) to the manufacturing factory 330.

At step 418, the boot ROM 210 authenticates and decrypts the KPK secured provisioning image 320 based on the KPK 222(N). At step 420, the boot ROM 210 causes the provisioning image to execute. As the provisioning image executes, the provisioning image configures the production chip 301 to enable secure consumer execution of the KPK and BAK secured production image 316. At step 422, the provisioning image complete executing and burns the production mode fuse 254. The manufacturing factory 330 then delivers the provisioned production chip 301, now referred to as the secured consumer chip 355, to the consumer.

Figure 5:
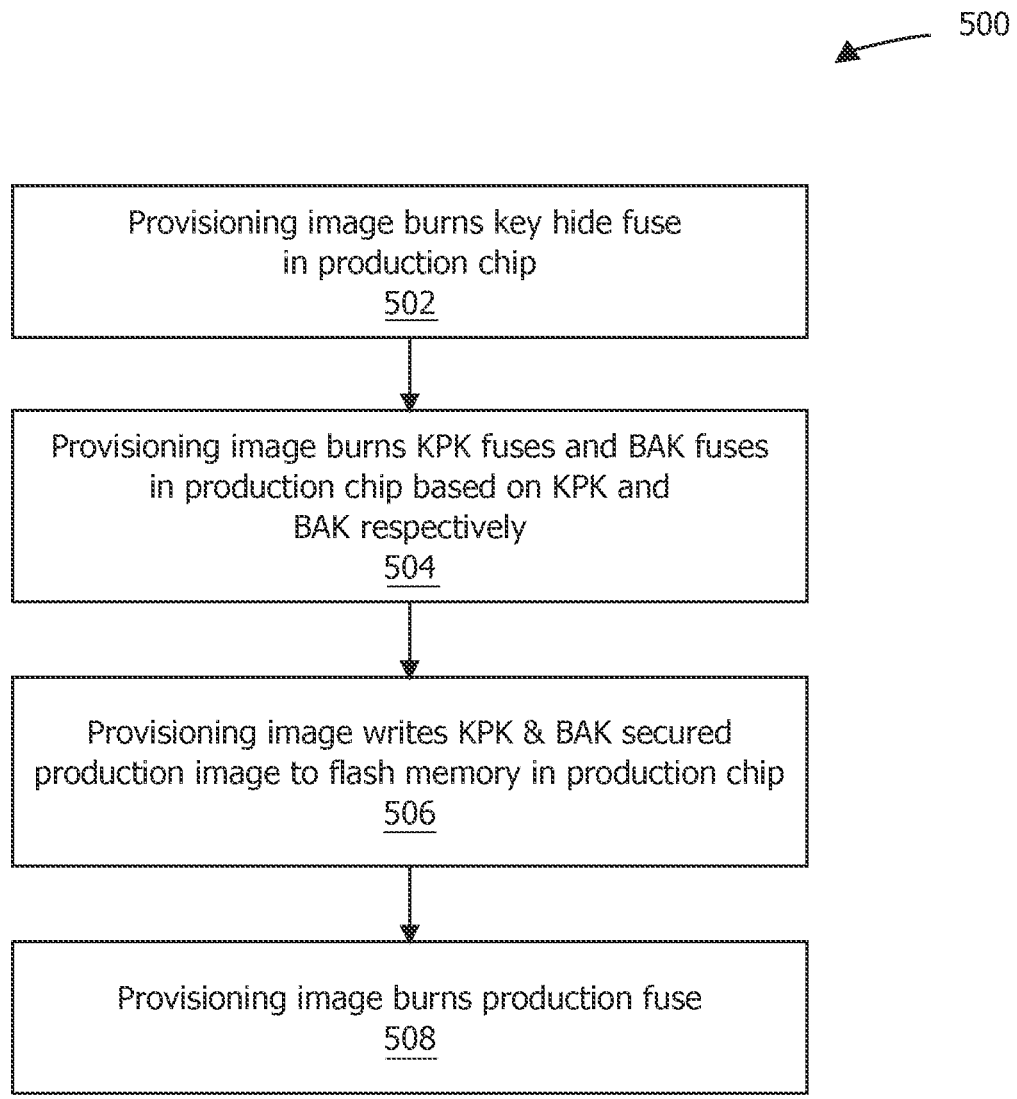
FIG. 5 is a flow diagram of method steps for configuring security fuses and flash memory to enable consumer execution of a secured production image, according to one embodiment of the present invention.

FIG. 5 is a flow diagram of method steps for configuring security fuses and flash memory to enable consumer execution of a secured production image, according to one embodiment of the present invention. Although the method steps are described herein in conjunction with the systems of FIGS. 1-3, persons skilled in the art will understand that any system configured to implement the method steps, in any order, falls within the scope of the present invention.

At step 502, a provisioning image executing on the production chip 301 burns the key hide fuse 252 included in the secure provisioning subsystem 190. When the key hide fuse 252 is burned, read access to the KPK fuses 254 and the BAK fuses 256 is disabled. At step 504, the provisioning image burns the KPK fuses 254 and the BAK fuses 256 to reflect the values of the KPK 222 and the BAK 314 respectively. Advantageously, because read access to the KPK fuses 254 and the BAK fuses 256 is disabled, the values of the KPK 222 and the BAK 314 are shielded from any interlopers in the manufactory factory.

At step 506, the provisioning image configures the production chip 301 to securely execute the KPK and BAK secured production image 316. As part of step 506, the provisioning image may install software, configure hardware, etc. Notably, the provisioning image performs read operations that store the KPK and BAK secured production image 316 in the flash memory 270 included in the secure provisioning subsystem 190. In alternate embodiments, the provisioning image may configure the production chip 301 in any method that is consistent with the secure provisioning subsystem 190.

At step 508, the provisioning image burns the production mode fuse 254. After the production mode fuse 254 is burned, the production chip 301 is considered to be successfully provisioned and is referred to as the secure consumer chip 335. In operation, the secure consumer chip 335 gates the execution of the KPK and BAK secured production image 316 based on successful verification of the KPK 222 and BAK 314. If the verification fails, then the secure consumer chip 335 does not execute the production image. By contrast, if the verification succeeds, then the secure consumer chip 335 securely and efficiently executes the production image, leveraging any resources that the provisioning image configured as part of the provisioning process.

In sum, a secure provisioning subsystem included in semiconductor chips enables manufacturing factories to securely provision the chips without access to any confidential, unencrypted information, such as security keys. Notably, the secure provisioning subsystem includes a boot read only memory (ROM) that has exclusive access to a private set of key provision keys (KPKs). In operation, the chip provider manufactures production chips with the KPK set embedded in the boot ROM. For each OEM, the chip provider selects one of the KPKs in the KPK set and confidentially delivers this OEM KPK and the corresponding KPK index (i.e., the location of the OEM KPK within the KPK set) to the OEM. The OEM generates a boot authentication key (BAK) and production image and, subsequently, signs and encrypts the production image based on both the OEM KPK and the BAK. The OEM then composites this secured production image along with the BAK, provisioning instructions, and any additional confidential provisioning data, into a provisioning image. After generating the provisioning image, the OEM signs and encrypts the provisioning image based on the OEM KPK.

The OEM delivers the secured provisioning image, the KPK index, and the production chips to the manufacturing factory. At the manufacturing factory, the OEM causes the boot ROM to execute. As part of the boot ROM execution, the boot ROM reads the KPK index and then performs read operations on the embedded KPK set based on the KPK index—indirectly obtaining the OEM KPK. Subsequently, the boot ROM authenticates and decrypts the provisioning image based on the OEM KPK and causes the provisioning image to execute. The provisioning image confidentially configures the production chip in any technically feasible fashion that is compatible with the secure provisioning subsystem. After the provisioning image finishes executing, the manufacturing factory delivers the production chip (now a secure consumer chip) to the consumer.

Advantageously, embedding a private KPK set in the boot ROM during the chip manufacturing process enables provisioning that preserves the security of each OEM and the consumer regardless of the integrity of the selected manufacturing factory. Notably, each OEM only receives the value of a single KPK—the one assigned to the particular OEM—and the manufacturing factory receives the value of none of the KPKs. Since the provisioning image is encrypted based on the KPK, there is no opportunity for malicious entities in the manufacturing factory to acquire the KPK, the BAK, or decrypt the production image. By contrast, in conventional secure provisioning techniques, the manufacturing factory receives the security key(s) used to encrypt the provisioning image, thereby conflating the effectiveness of the secure provisioning with the integrity of the manufacturing factory. Since the disclosed techniques are effective irrespective of the trustworthiness of the manufacturing factory, these techniques eliminate the security lapse that occurs at the manufacturing factory in conventional secure provisioning.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A computer-implemented method for enabling secure execution of provisioning images within semiconductor chips, the method comprising:
   generating a first semiconductor chip that includes a key provision key (KPK) set, wherein the KPK set includes a first KPK located at a first KPK index and a second KPK located at a second KPK index;

configuring the semiconductor chip with instructions that, upon execution in conjunction with the first KPK index in a secure provisioning mode at a second entity, cause a first encrypted provisioning image that reflects a first entity-specific functionality to be securely decrypted and executed based on the first KPK without disclosing outside of the semiconductor chip the first KPK or the second KPK; and sending the first semiconductor chip, the first KPK, and the first KPK index to the first entity, but keeping the second KPK secret from the first entity.

2. The method of claim 1, wherein the first semiconductor chip includes a key hide fuse, one or more KPK fuses, and a production fuse; and decrypting and executing the first encrypted provisioning image comprises:

burning the key hide fuse to restrict access to the KPK fuses;

burning the one or more KPK fuses to reflect the first KPK; and burning the production fuse to indicate that the first semiconductor chip is provisioned.

3. The method of claim 1, wherein securely decrypting and executing the first encrypted provisioning image comprises:

determining the first KPK based on performing one or more read operations that access the KPK set at the first KPK index, without disclosing the first KPK;

applying the first KPK to the first encrypted provisioning image to generate a first confidential provisioning image; and causing the first confidential provisioning image to execute.

4. The method of claim 3, wherein the first confidential provisioning image includes a first secured production image, and decrypting and executing the first encrypted provisioning image comprises enabling the first semiconductor chip to execute the first secured production image.

5. The method of claim 4, wherein the first encrypted provisioning image further includes a boot authentication key (BAK), and the first secured production image is encrypted based on at least one of the first KPK and the BAK.

6. The method of claim 1, further comprising:

at the first entity, generating the first encrypted provisioning image based on applying the first KPK to a first confidential provisioning image that, when executed, provisions the first semiconductor chip; and sending the first semiconductor chip, the first encrypted provisioning image, and the first KPK index to the second entity, but keeping the first KPK key secret from the second entity.

7. The method of claim 6, wherein sending the first KPK index to the second entity comprises generating a header file that includes the first KPK index and transmitting the header file to the second entity.

8. The method of claim 1, further comprising, at a second entity, activating the semiconductor chip in the provisioning mode and supplying the first KPK index to the semiconductor chip.

9. The method of claim 1, further comprising configuring the semiconductor chip with additional instructions that, upon execution in conjunction with the second KPK index in a secure provisioning mode at second entity, cause a second encrypted provisioning image that reflects another first-entity specific functionality to be securely decrypted and executed based on the second KPK without disclosing outside of the semiconductor chip the first KPK or the second KPK.

10. A non-transitory computer-readable storage medium including instructions that, when executed by a processor, cause the processor to enable secure execution of a provisioning image within a semiconductor chip by performing the steps of:

upon receiving at a second entity a first key provision key (KPK) index in a secure provisioning mode, securely decrypting and executing a first encrypted provisioning image that reflects a first entity-specific functionality based on a first KPK without disclosing outside of the semiconductor chip the first KPK or a second KPK;

wherein the semiconductor chip includes the first KPK located at the first KPK index and the second KPK located at a second KPK index.

11. The non-transitory computer-readable storage medium of claim 10, wherein the first semiconductor chip includes a key hide fuse, one or more KPK fuses, and a production fuse; and decrypting and executing the first encrypted provisioning image comprises:

burning the key hide fuse to restrict access to the KPK fuses;

burning the one or more KPK fuses to reflect the first KPK; and burning the production fuse to indicate that the first semiconductor chip is provisioned.

12. The non-transitory computer-readable storage medium of claim 10, wherein securely decrypting and executing the first encrypted provisioning image comprises:

determining the first KPK based on performing one or more read operations that access the KPK set at the first KPK index, without disclosing the first KPK;

applying the first KPK to the first encrypted provisioning image to generate a first confidential provisioning image; and causing the first confidential provisioning image to execute.

13. The non-transitory computer-readable storage medium of claim 12, wherein the first confidential provisioning image includes a first secured production image, and decrypting and executing the first encrypted provisioning image comprises enabling the first semiconductor chip to execute the first secured production image.

14. The non-transitory computer-readable storage medium of claim 13, wherein the first encrypted provisioning image further includes a boot authentication key (BAK), and the first secured production image is encrypted based on at least one of the first KPK and the BAK.

15. A method for enabling secure execution of provisioning images within semiconductor chips, the method comprising:

generating a first semiconductor chip;

generating a secure provisioning subsystem that includes:
    a boot read-only memory that includes a plurality of instructions, and
    a key provision key (KPK) set that includes a first KPK located at a first KPK index and a second KPK located at a second KPK index,
    wherein the plurality of instructions, upon execution in conjunction with the first KPK index in a secure provisioning mode at a second entity, cause a first encrypted provisioning image that reflects a first entity-specific functionality to be securely decrypted and executed based on the first KPK without disclosing outside of the semiconductor chip the first KPK or the second KPK; and embedding the secure provisioning subsystem within the first semiconductor chip, wherein the first semiconductor chip, the first KPK, and the first KPK index are sent to the first entity, but the second KPK is kept secret from the first entity.

16. The system method of claim 15, wherein the first semiconductor chip includes a key hide fuse, one or more KPK fuses, and a production fuse; and decrypting and executing the first encrypted provisioning image comprises:

burning the key hide fuse to restrict access to the KPK fuses;

burning the one or more KPK fuses to reflect the first KPK; and burning the production fuse to indicate that the first semiconductor chip is provisioned.

17. The method of claim 15, further comprising:

at the first entity, generating the first encrypted provisioning image based on applying the first KPK to a first confidential provisioning image that, when executed, provisions the first semiconductor chip; and sending the first semiconductor chip, the first encrypted provisioning image, and the first KPK index to a second entity, but keeping the first KPK key secret from the second entity.

18. The method of claim 15, further comprising sending the first KPK index to the second entity by generating a header file that includes the first KPK index and transmitting the header file to the second entity.

19. The method of claim 15, further comprising, at a second entity, activating the semiconductor chip in the provisioning mode and supplying the first KPK index to the semiconductor chip.

20. The method of claim 15, wherein the boot read-only memory includes addition instructions that, upon execution in conjunction with the second KPK index in a secure provisioning mode at second entity, cause a second encrypted provisioning image that reflects another first-entity specific functionality to be securely decrypted and executed based on the second KPK without disclosing outside of the semiconductor chip the first KPK or the second KPK.

* * * * *

UNITED STATES PATENT AND TRADEMARK OFFICE
CERTIFICATE OF CORRECTION

| | |
|---|---|
| PATENT NO. | : 9,590,806 B2 |
| APPLICATION NO. | : 14/723411 |
| DATED | : March 7, 2017 |
| INVENTOR(S) | : Jay Huang, Paul Chou and Anthony Woo |

It is certified that error appears in the above-identified patent and that said Letters Patent is hereby corrected as shown below:

In the Claims

Column 13, Claim 16, Line 8, please delete "system".

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*